United States Patent
Hill

(10) Patent No.: US 10,241,386 B2
(45) Date of Patent: Mar. 26, 2019

(54) FLAT FOLDING PROJECTION DEVICE

(71) Applicant: Sally D. Hill, Guilford, CT (US)

(72) Inventor: Sally D. Hill, Guilford, CT (US)

(73) Assignee: The Eli Whitney Museum, Inc., Hamden, CT (US)

(*) Notice: Subject to any disclaimer, the term of this patent is extended or adjusted under 35 U.S.C. 154(b) by 0 days.

(21) Appl. No.: 15/926,315

(22) Filed: Mar. 20, 2018

(65) Prior Publication Data
US 2018/0267396 A1 Sep. 20, 2018

Related U.S. Application Data

(60) Provisional application No. 62/473,647, filed on Mar. 20, 2017.

(51) Int. Cl.
| | |
|---|---|
| *G03B 21/30* | (2006.01) |
| *G03B 21/14* | (2006.01) |
| *G02B 27/09* | (2006.01) |

(52) U.S. Cl.
CPC ......... *G03B 21/30* (2013.01); *G02B 27/0955* (2013.01); *G03B 21/145* (2013.01)

(58) Field of Classification Search
CPC .................. G03B 21/30; G03B 21/145; B65D 2571/002; B65D 2571/0066; B65D 2571/0265; B65D 2571/00666; B65D 2571/00728
See application file for complete search history.

(56) References Cited

U.S. PATENT DOCUMENTS

| | | | |
|---|---|---|---|
| 4,640,597 A * | 2/1987 | Okano | ................... G03B 21/30 353/101 |
| 2016/0165208 A1* | 6/2016 | Liu | ....................... G03B 21/145 348/43 |

* cited by examiner

*Primary Examiner* — Sultan Chowdhury
(74) *Attorney, Agent, or Firm* — St. Onge Steward Johnston & Reens, LLC

(57) ABSTRACT

A kit for creating a flat folding projection device is provided and includes a lens and a sheet defining at least a first, second, third and fourth panels, each panel separated from the other panels by at least one fold. A hole is positioned in the first panel, the hole defining an edge. A cut is positioned in the first panel adjacent to the hole such that the first panel on either side of the cut can be separated to create a space configured to receive and hold the lens therein. Further includes is one of: a light source, a translucent sheet or a light source and a translucent sheet. An envelope contains the foregoing such that a thickness of the envelope is less than ½ inches.

14 Claims, 8 Drawing Sheets

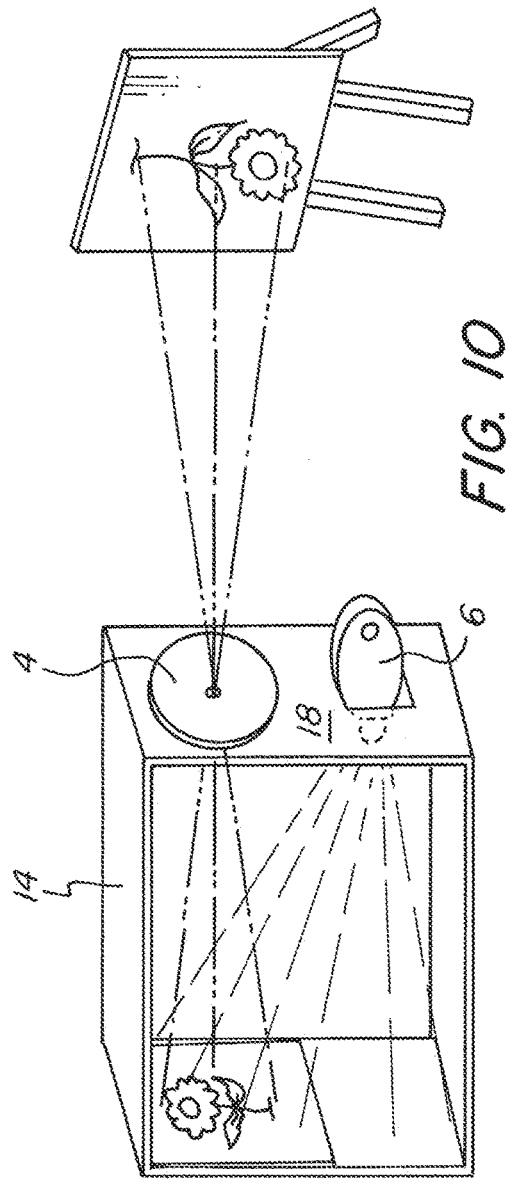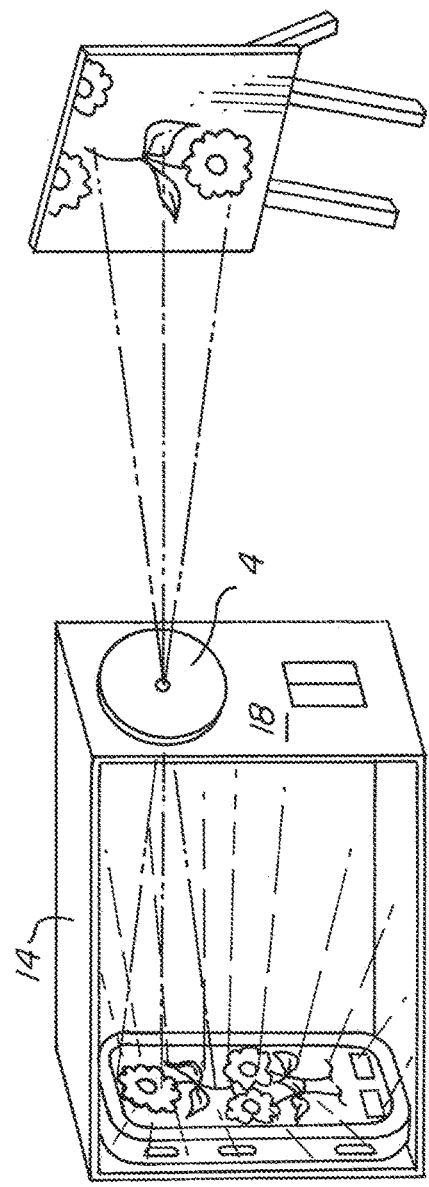
FIG. 10
FIG. 11

FLAT FOLDING PROJECTION DEVICE

FIELD OF THE INVENTION

The following relates to a folding projection device and kit therefore. More specifically, the following relates to a folding projection device that can fit into a US First Class mail envelope when folded.

BACKGROUND OF THE INVENTION

Various projection devices are known in the art such as pin hole cameras and the camera obscura as originally conceived by Leonardo da Vinci. These devices allow for object images to be projected in a variety of ways, depending on the orientation of the projector. However, these devices are often bulky and unwieldy such that a significant size package is required to ship them. In addition to being bulky, the materials used to make these projectors are often relatively expensive and not suitable for mass mailings or for inexpensive arts and crafts projects.

SUMMARY OF THE INVENTION

Therefore, the present invention solves these disadvantages by supplying a folding projection device made from inexpensive materials such as paperboard and the like. The paperboard provides for a printable substrate that can be either machine printed or can be drawn on by users. Furthermore, a light source and a lens is supplied to further enhance the capabilities of the projector.

It is therefore an object of the present invention to provide a projector that can be assembled from a flat sheet and folded flat.

It is another object of the present invention to supply a projector that when folded will fit in a US First Class Mail envelope and meet bulk mailing requirements.

It is another object of the present invention to enable the projector to be printed or drawn on for use as a crafts project or as a greeting or invitation card.

These and other objects are achieved by providing a flat folding projection device having a sheet defining a plurality of panels including first, second, third and fourth panels, each panel separated from the other panels by at least one fold. A hole is positioned in the first panel, the hole defining an edge. A cut is positioned in the first panel adjacent to the hole such that the first panel on either side of the cut can be separated to create a space configured to receive and hold a lens therein. An adhesive configured to join the first, second, third and fourth panels in a continuous loop such that when joined, the first and third panels are adjacent to the second and fourth panels. A plurality of flaps extending from the first, second, third and fourth panels, each of the plurality of flaps separated from its respective panels by at least one fold, the flaps configured to fold relative to their respective panels to create a bottom and a top to define a closed space between the bottom, top and the plurality of panels. The plurality of flaps and plurality of panels configured fold between flat and unfolded positions such that in the unfolded position, the first and third panels are opposite and facing one another and in the flat position, one of the at least one fold that separates two of the plurality of panels is at approximately a 180 degree fold such that two of the plurality of panels adjacent to each other are facing each other. The third panel positioned opposite the first panel in the unfolded position and the third panel having a cutout configured to receive a translucent element such that an object image exterior to said closed space is projected on the translucent element.

In other aspects a flat folding projection device is provided with sheet defining a plurality of panels including first, second, third and fourth panels. Each panel separated from the other panels by at least one fold. A hole is positioned in a first panel, the hole defining an edge. A cut is positioned in the first panel adjacent to the hole such that the first panel on either side of the cut can be separated to create a space configured to receive and hold a lens therein. An adhesive is configured to join the first, second, third and fourth panels in a continuous loop such that when joined, the first and third panels are adjacent to the second and fourth panels. A plurality of flaps extend from the first, second, third and fourth panels, each of the plurality of flaps separated from its respective panels by at least one fold the flaps configured to fold relative to their respective panels to create a bottom and a top to define a closed space between the bottom, top and the plurality of panels. The flaps and panels configured fold between flat and unfolded positions such that in the unfolded position, the first and third panels are opposite and facing one another and in the flat position, one of the at least one fold that separates two of the plurality of panels is at approximately a 180 degree fold such that two of the plurality of panels adjacent to each other are facing each other. An opening in the first panel configured to receive a light source there through such that an image in the closed space is projected to a surface outside the closed space.

In certain aspects, the third panel is positioned opposite the first panel in the unfolded position and the third panel has a cutout. One of the plurality of flaps is connected to the third panel and configured to fold into the closed space to cover the cutout. In other aspects, the image is positioned on the third panel. In other aspects, the light source is a computing device with a display positioned in the closed space and said image is displayed on said display.

In other aspects a kit for creating a flat folding projection device is provided. The kit includes a lens and a sheet defining at least a first, second, third and fourth panel, each panel separated from the other panels by at least one fold. A hole is positioned in the first panel, the hole defining an edge. A cut is positioned in the first panel adjacent to the hole such that the first panel on either side of the cut can be separated to create a space configured to receive and hold the lens therein. Further provided is one of: a light source, a translucent sheet or a light source and a translucent sheet. An envelope contains the foregoing such that a thickness of said envelope is less than ½ inches.

In certain embodiments the thickness is ¼ inches or less. In other aspects, the kit includes the translucent sheet and further includes a cutout in the third panel such that the translucent sheet is configured to cover the cutout. In other aspects, the first and fourth panels are connected together such that said first, second, third and fourth panels form a closed loop and the first and third panels and the second and fourth panels are parallel. In other aspects, flaps are connected to the sheet, the flaps are configured to fold to create a closed box shape defining an interior closed space. In other aspects a flap on the third panel includes two sections, a first section configured to cover a cutout of the third panel and the second section configured to fit into a cut in the third panel to hold said first section in a position that covers the cutout. In other aspects the cut in the first panel includes a section positioned at a distance from a center of the hole in the first panel, the distance at least as large as a radius of the lens. In other aspects, the cut is curved and includes two ends and a middle section which curves inwardly towards a center of the hole. In other aspects, the cut includes two cuts separated radially about the hole.

Other objects of the invention and its particular features and advantages will become more apparent from consideration of the following drawings and accompanying detailed description.

BRIEF DESCRIPTION OF THE DRAWINGS

FIG. 10 is a perspective view of the projector of FIG. 1 in one mode of operation.

FIG. 11 is a perspective view of the projector of FIG. 1 in an alternate mode of operation.

DETAILED DESCRIPTION OF THE INVENTION

Figure 1:
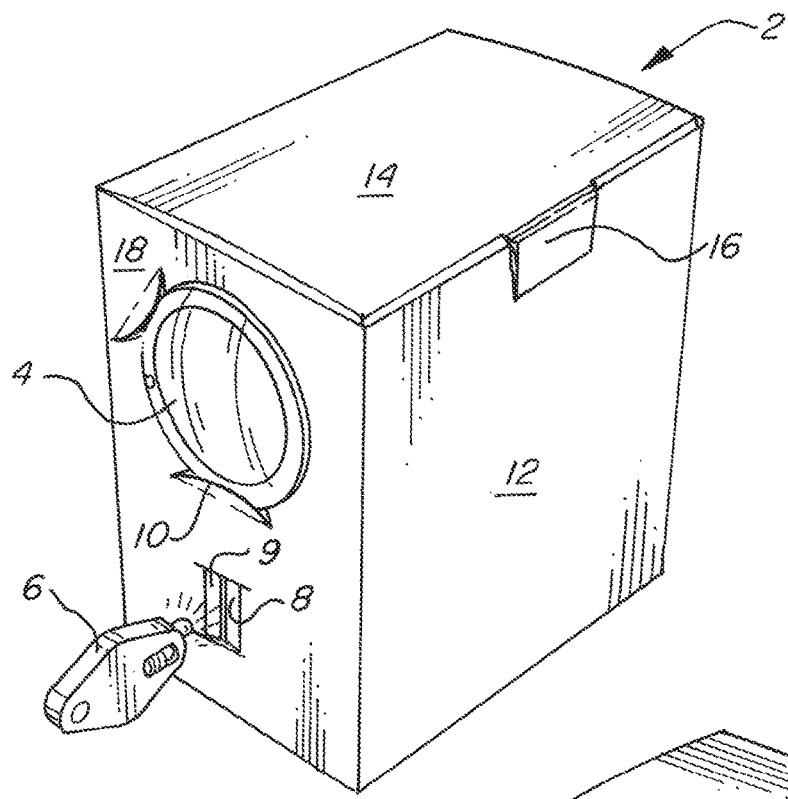
FIG. 1 is front perspective view of a projector according to the present invention
Figure 2:
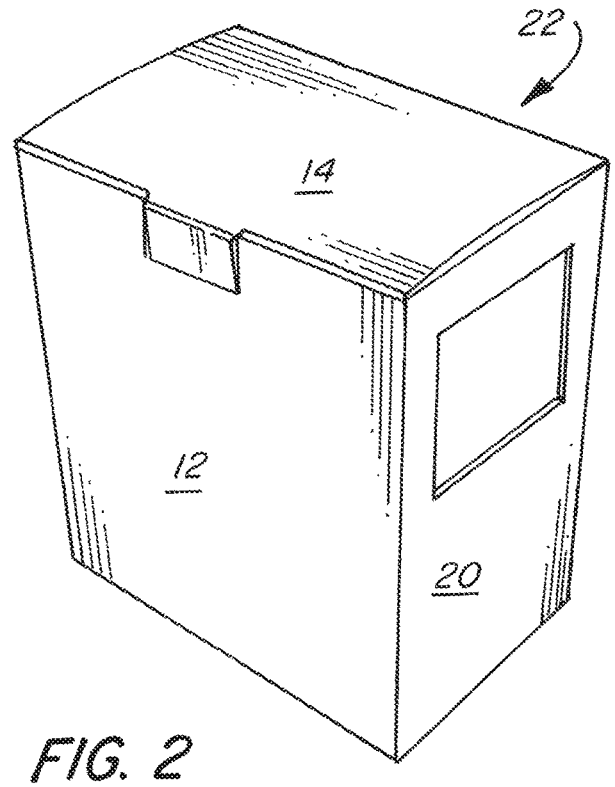
FIG. 2 is a rear perspective view of FIG. 1

Referring now to the drawings, wherein like reference numerals designate corresponding structure throughout the views. The following examples are presented to further illustrate and explain the present invention and should not be taken as limiting in any regard.

The projector 2 is supplied with a lens 4 and light source 6. The light source fits into opening 8 which is defined by two flaps 9 which are cut around three sides to allow for the light source 6 to be inserted into the opening 8 but for the opening to be closed when the light source is not being used in a particular projection mode described herein.

The lens 4 fits into cut flap 10 where a cut is made in face 18 such that the lens can be fit into the cut to secure the lens to the face 18. Behind the lens 4 is a hole 24, which in the embodiment shown in round. On the opposite face, hole 44 is provided and is square to allow for a particular projection mode further shown and described herein.

The projector is made of a thin and generally flexible material. Commonly, this would be a paper based material such as paperboard, but it is contemplated that other materials can be used provided that they can fold flat.

Figure 3:
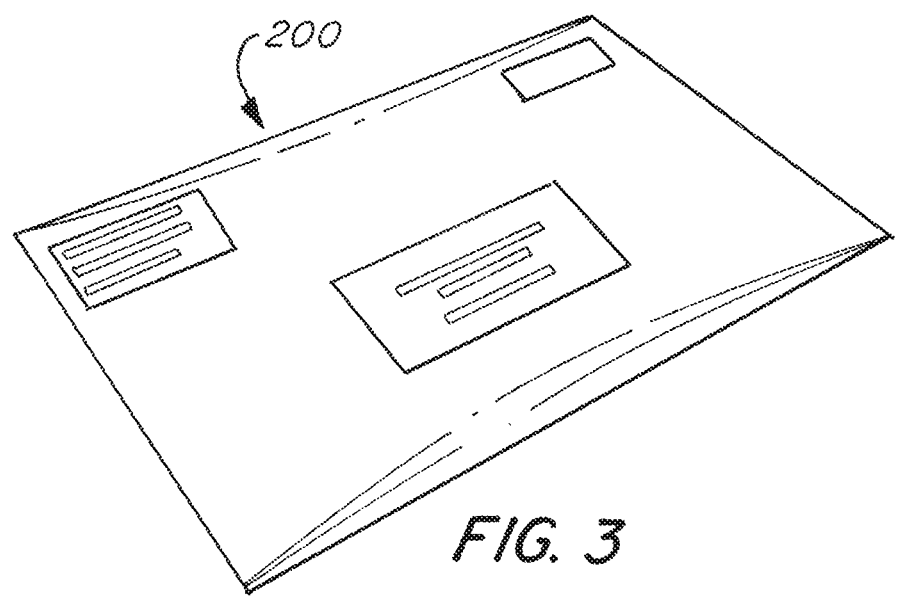
FIG. 3 is a perspective view of an envelope containing the projector of FIG. 1 in a folded state
Figure 4:
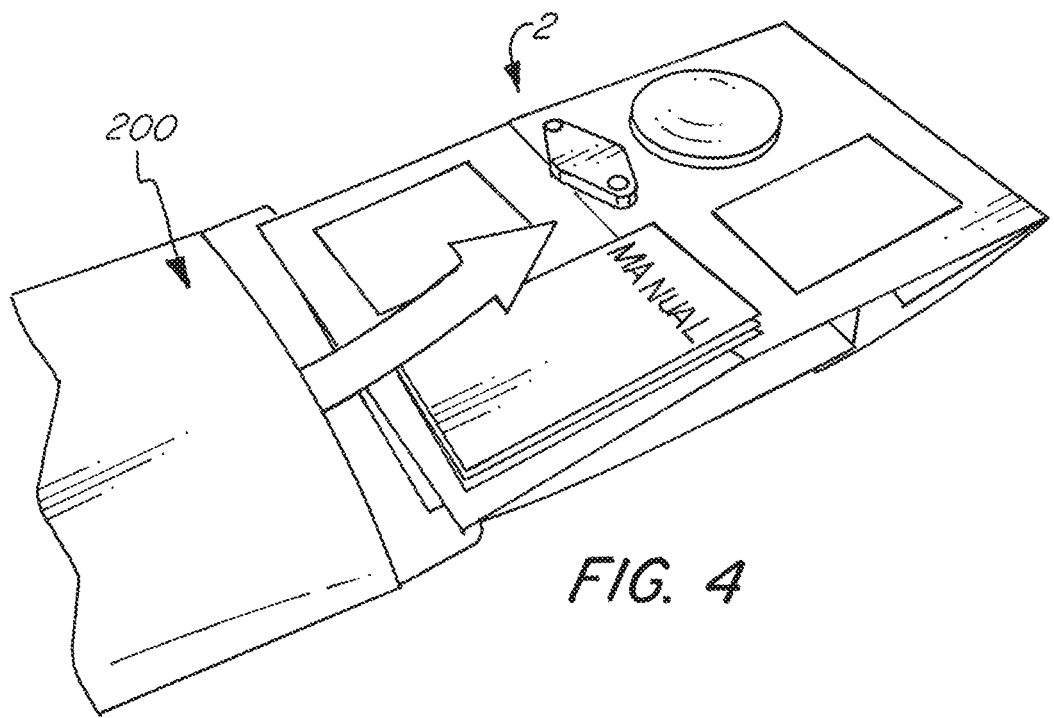
FIG. 4 is perspective view of the envelope of FIG. 3 opened to show the folded projector of FIG. 1 therein.

Referring to FIGS. 3 and 4, the envelope 200 which contains the projector 2 is shown. As can be seen, the projector 2 folds flat to fit in the envelope and this envelope can be mailed inexpensively using first class bulk mailing. Particularly, the envelope dimensions are within the following ranges: Length 5 inches to 11.5 inches; Height 3.5 inches to 6.125 inches; Thickness 0.007 inches to 0.25 inches. Particularly important is that the envelope when containing the projector and its parts is less than ½ inch and more importantly less than ¼ inch thick. In certain embodiments, the adhesive on panel 38 is already adhered to section 39 as provided in the envelope, in others, the user applies the adhesive and/or sticks panel 38 to section 39.

Figure 5:
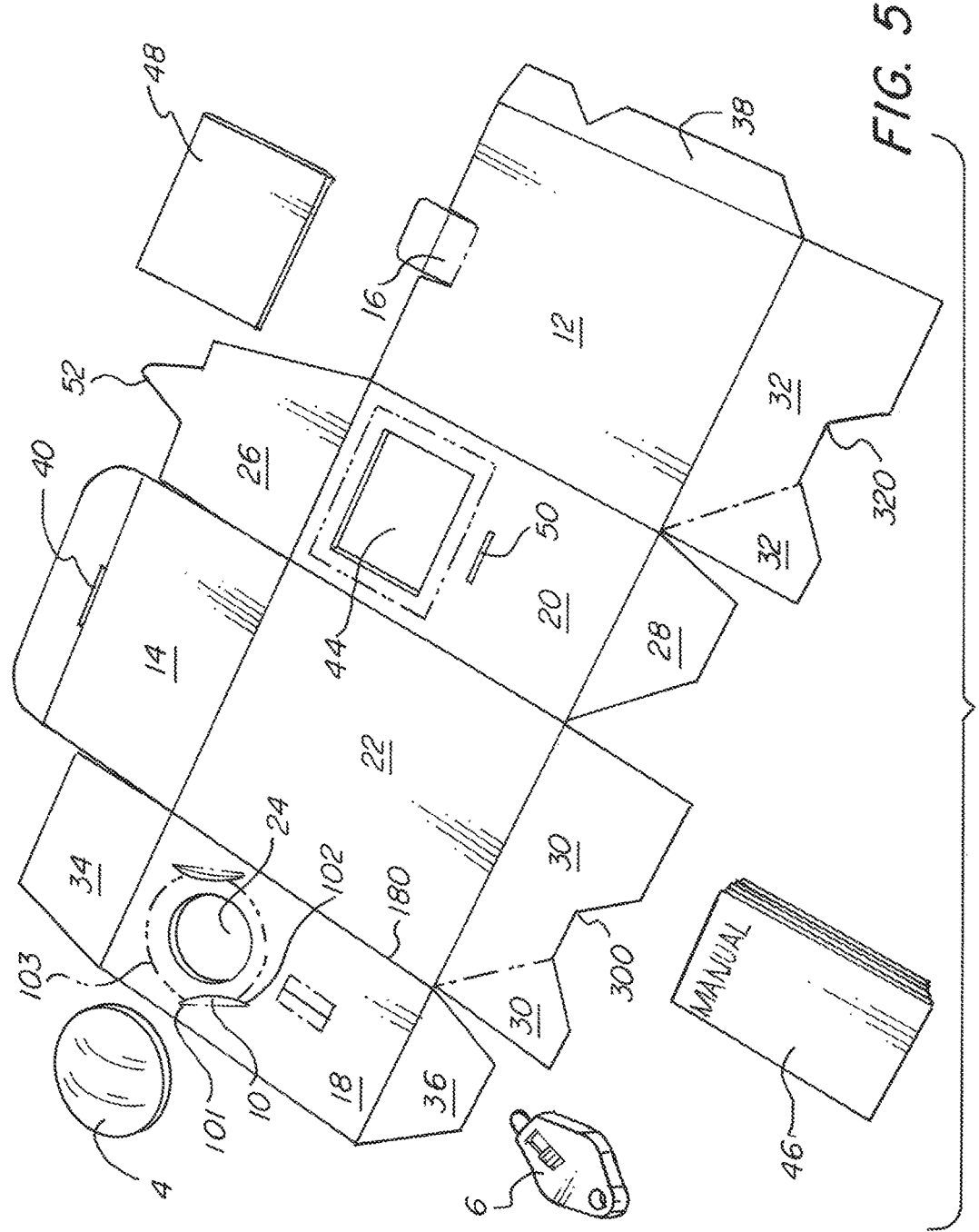
FIG. 5 is a perspective view of the projector of FIG. 1 in a flat state.
Figure 6:
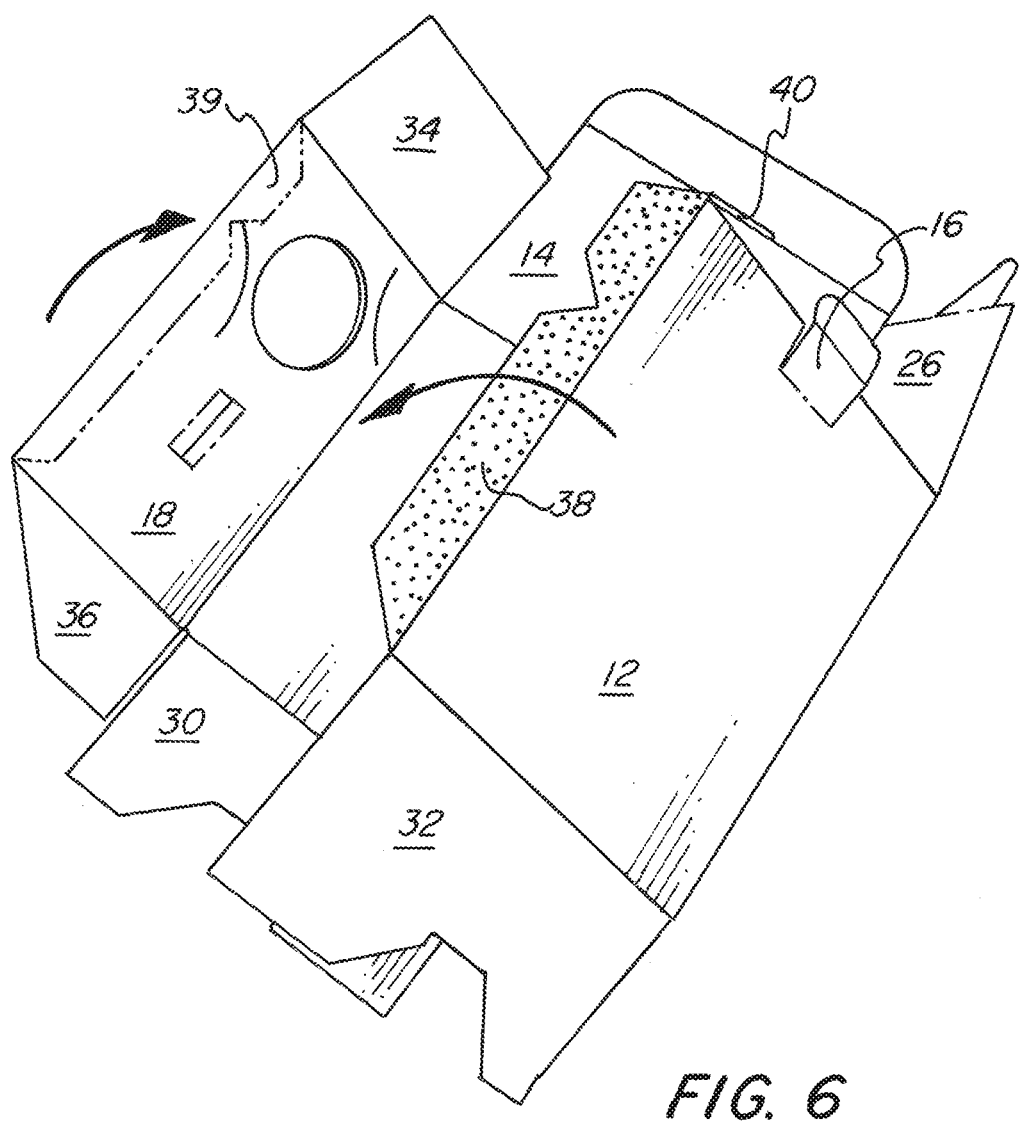
FIG. 6 is a perspective view of the projector of FIG. 1 being folded together.

FIG. 5 shows the projector in a flat state. The projector is made of a paperboard sheet that is die cut and scored to provide for easy folding and assembly. Main panels 18, 22, 20 and 12 are supplied to make up the front 18, sides 22/12 and rear 20 of the projector. Two of the panels 18 and 20 are provided with holes and a solid panel 22 is provided between two of the panels with holes therein. Hole 24 receives the lens 4 which is retained by the cut flaps 10 which are provided adjacent to the hole 24. The cut flaps are curved and extend between two points 101 and 102 which are coincident with a perimeter 103 of the lens 4 when installed. The cut flaps may extend beyond the two points 101/102 in certain embodiments, but do extend at least to and between the two points 101/102. As previously described opening 8 is also supplied in face 18 to allow for light source 6 to be introduced.

Top flaps 34 and 36 are supplied to close the interior cavity of the projector when assembled. Between face 18 and 22 is a score line 180 that allows for easy folding in the correct location. It is understood that the lines shown between the various faces and flaps shown and described are similar score lines that enable this folding. Flaps 28 and 36 are cut so as to taper away from faces 18 and 20 respectively such that when face 18 and 22 and 22 and 20 are positioned at 90 degrees to each other for assembly, additional space is provided for ease of assembly and flat folding.

Notches 300 and 320 are supplied on flaps 30 and 32 respectively to interlock together in the assembled state. Closure flap 16 is supplied on face 12 and fits into cut 40 on the top flap 14 to securely close the projector when assembled. Also supplied with the kit is a translucent screen 48 and a manual 46 with instructions for assembling the projector.

Figure 7:
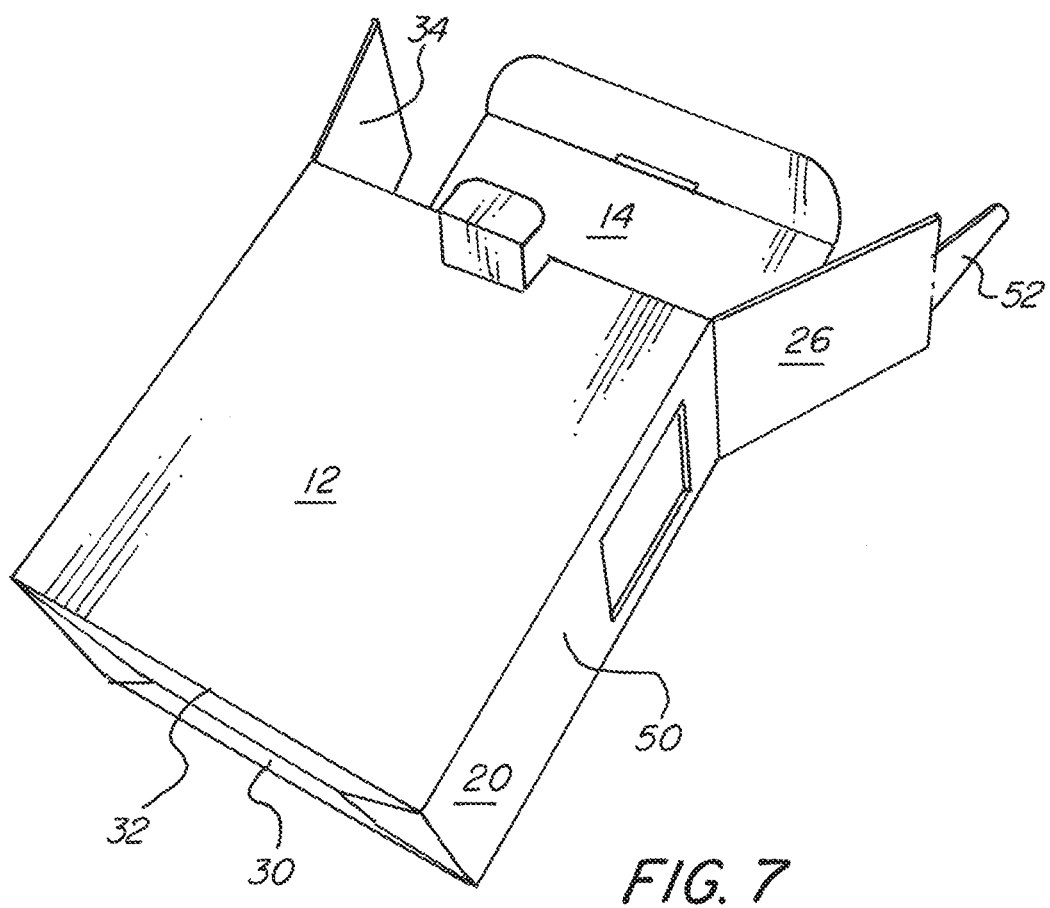
FIG. 7 is a perspective view of the projector having been glued together and partially assembled.
Figure 8:
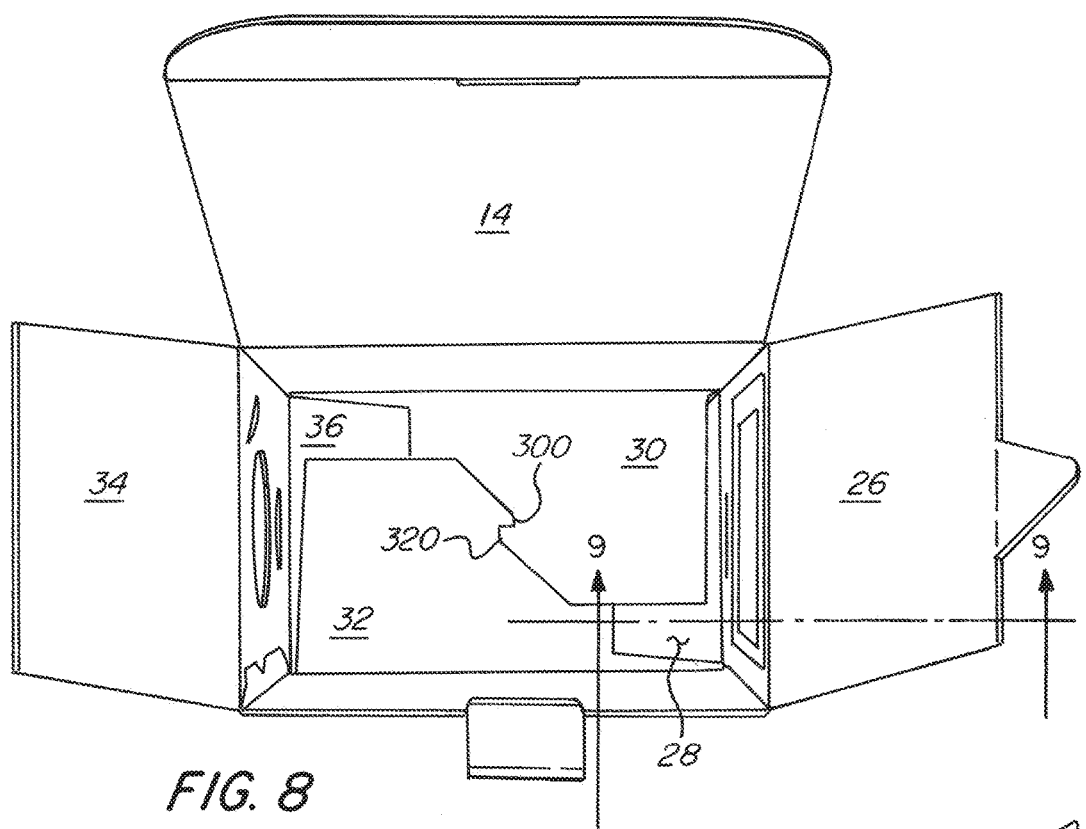
FIG. 8 is a top view of the projector of FIG. 1

To assemble the projector, face 38 is supplied with an adhesive or an adhesive is applied thereto. Face 38 is then adhered to the back of face 18 at space 39 to provide for a partially closed box. Bottom flaps 30, 32, 36 and 28 are then folded together in an interlocking manner such that flap 36 is between flap 32 and 30 and flap 28 is between flap 32 and 30. Sections 30' and 32' of the flaps 30 and 32 are provided to interlock between flaps 28 and 30 and flaps 36 and 32 respectively. FIG. 7 shows the projector sides and bottom assembled and a top view of the assembled bottom is shown in FIG. 8. Once the face 38 is adhered to the back of face 18, the projector can still fold flat and fit in the envelope 3 as shown. In this case, the bottom flaps 30, 32, 36 and 28 are folded inwardly and the top flap may be folded outwardly such that the outer faces of flaps 14 and 22 face each other and the inner faces of flaps 36, 30, 28, 32 face respective faces 18, 22, 20 and 12.

In addition, panel 32' and 30' may be adhered to panels 28 and 36 respectively. In this case, the panels 32' and 30' are folded completely—i.e. at 180 degrees and stuck to a rear face of panel 28/36, the "rear" face of panels 28/36 being the face opposite that shown in FIG. 5. In such an embodiment, the sheet when assembled can continue to fold flat such that in the flat configuration, panel 30' and 30 are generally flat and aligned whereas when folded, panel 30' and 30 are folded with respect to each other.

Figure 9:
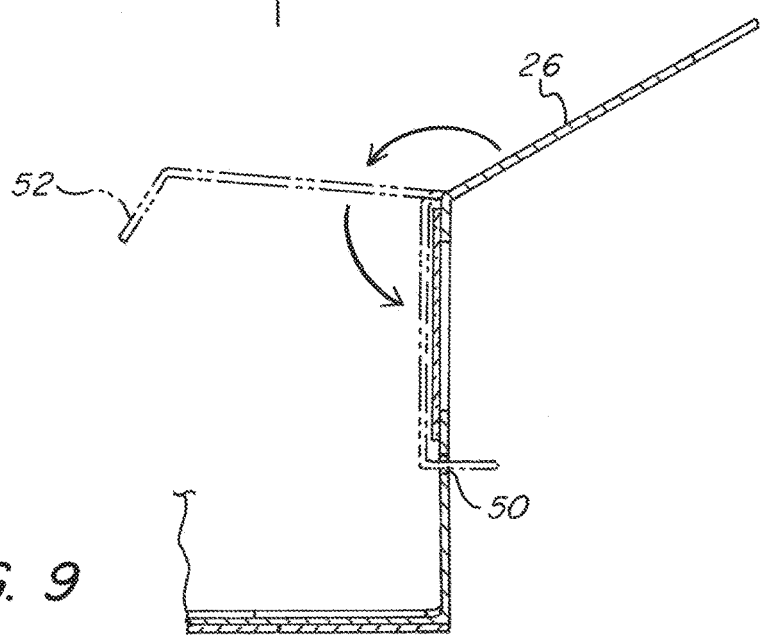
FIG. 9 is a sectional view along 9-9.

As seen in FIG. 9, tab 52 of flap 26 can fit into cut 50 to close off hole 44 in certain embodiments. Furthermore, flap 26 can be used for drawing (or printing) of an image thereon on what would be the exterior face of flap 26 when folded at 90 degrees, but when folded in as shown in FIG. 9, flap 26 would face the hole 24 to provide for projection of the image drawn thereon.

The projection of the image on flap 26 is shown in FIG. 10. The light source is fit into opening 8 and activated. The lens then projects the image and as can be seen, the image is displayed upside down. It is also contemplated that the image on the flap 26 could be drawn right side up when put on the flap 26 in the orientation of FIG. 5. Then, when the flap 26 is folded over, the image would be upside down in the interior space of the projector but then would be right side up when projected.

FIG. 11 shows an embodiment where a smart phone is placed inside the projector space. Since the smart phone already has a lighted screen, the light source may not be necessary and the opening 8 would be closed.

Figure 12:
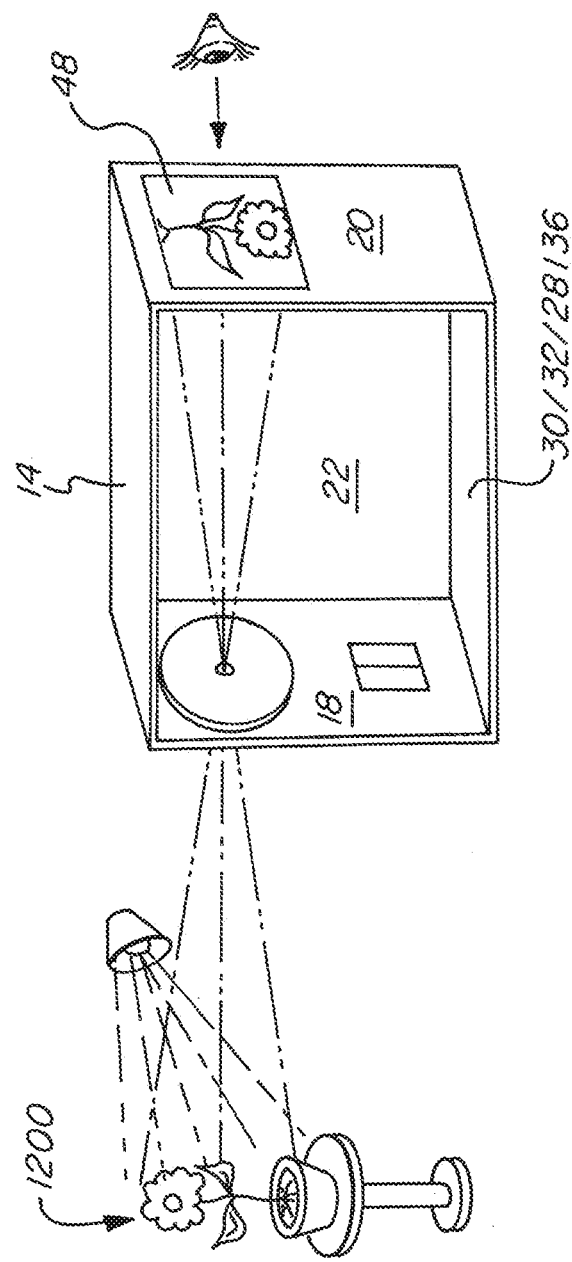
FIG. 12 is a perspective view of the projector of FIG. 1 in yet another mode of operation.

FIG. 12 shows another configuration where the translucent screen 48 is used for projection of an object 1200. In the shown configuration, flap 26 would not be folded down as shown in FIG. 9 but would rather be generally parallel with top flap 14.

The various panels and flaps described herein can also be printed with decorative or informational matter. For example.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A flat folding projection device comprising:
   a sheet defining a plurality of panels, each panel separated from the other panels by at least one fold;
   a hole positioned in a first panel, the hole defining an edge;
   a cut positioned in the first panel adjacent to the hole such that the first panel on either side of the cut can be separated to create a space configured to receive and hold a lens therein;
   a second, third and fourth panels;
   an adhesive configured to join the first, second, third and fourth panels in a continuous loop such that when joined, the first and third panels are adjacent to the second and fourth panels;
   a plurality of flaps extending from the first, second, third and fourth panels, each of the plurality of flaps separated from its respective panels by at least one fold the flaps configured to fold relative to their respective panels to create a bottom and a top to define a closed space between the bottom, the top and the plurality of panels;
   said plurality of flaps and the plurality of panels are configured to fold between flat and unfolded positions such that in the unfolded position, the first and third panels are opposite and facing one another and in the flat position, one of the at least one fold that separates two of the plurality of panels is at approximately a 180 degree fold such that two of the plurality of panels adjacent to each other are facing each other;
   said third panel positioned opposite the first panel in the unfolded position and said third panel having a cutout configured to receive a translucent element such that an object image exterior to said closed space is projected on the translucent element.

2. A flat folding projection device comprising:
   a sheet defining a plurality of panels, each panel separated from the other panels by at least one fold;
   a hole positioned in a first panel, the hole defining an edge;
   a cut positioned in the first panel adjacent to the hole such that the first panel on either side of the cut can be separated to create a space configured to receive and hold a lens therein;
   a second, third and fourth panels;
   an adhesive configured to join the first, second, third and fourth panels in a continuous loop such that when joined, the first and third panels are adjacent to the second and fourth panels;
   a plurality of flaps extending from the first, second, third and fourth panels, each of the plurality of flaps separated from its respective panels by at least one fold the flaps configured to fold relative to their respective panels to create a bottom and a top to define a closed space between the bottom, the top and the plurality of panels;
   said plurality of flaps and the plurality of panels are configured to fold between flat and unfolded positions such that in the unfolded position, the first and third panels are opposite and facing one another and in the flat position, one of the at least one fold that separates two of the plurality of panels is at approximately a 180 degree fold such that two of the plurality of panels adjacent to each other are facing each other;
   an opening in the first panel configured to receive a light source there through such that an image in the closed space is projected to a surface outside the closed space.

3. The flat folding projection device of claim 2 wherein said third panel is positioned opposite the first panel in the unfolded position and said third panel having a cutout, one of said plurality of flaps connected to said third panel configured to fold into said closed space to cover the cutout.

4. The flat folding projection device of claim 3 wherein said image is positioned on the third panel.

5. The flat folding projection device of claim 3 wherein said light source is a computing device with a display positioned in the closed space and said image is displayed on said display.

6. A kit for creating a flat folding projection device comprising:
   a lens;
   a sheet defining at least a first, second, third and fourth panel, each panel separated from the other panels by at least one fold;
   a hole positioned in the first panel, the hole defining an edge;
   a cut positioned in the first panel adjacent to the hole such that the first panel on either side of the cut can be separated to create a space configured to receive and hold the lens therein;
   one of: a light source, a translucent screen or a light source and translucent screen;
   an envelope containing the foregoing such that a thickness of said envelope is less than ½ inches.

7. The kit of claim 6 wherein the thickness is ½ inches or less.

8. The kit of claim 6 including the translucent sheet and further comprising a cutout in said third panel such that said translucent sheet is configured to cover said cutout.

9. The kit of claim 6 wherein said first and fourth panels are connected together such that said first, second, third and fourth panels form a closed loop such that said first and third panels and said second and fourth panels are parallel.

10. The kit of claim 9 further comprising flaps connected to said sheet, said flaps configured to fold to create a closed box shape defining an interior closed space.

11. The kit of claim 6 wherein a flap on said third panel includes two sections, a first section configured to cover a cutout of said third panel and the second section configured to fit into a cut in said third panel to hold said first section in a position that covers the cutout.

12. The kit of claim 6 wherein the cut in the first panel includes a section positioned at a distance from a center of the hole in the first panel, the distance at least as large as a radius of said lens.

13. The kit of claim 6 wherein the cut is curved and includes two ends and a middle section which curves inwardly towards a center of the hole.

14. The kit of claim 13 wherein the cut includes two cuts separated radially about the hole.

\* \* \* \* \*